United States Patent
Saliba et al.

(10) Patent No.: US 10,769,209 B1
(45) Date of Patent: Sep. 8, 2020

(54) APPARATUS AND METHOD FOR TEMPLATE DRIVEN DATA EXTRACTION IN A SEMI-STRUCTURED DOCUMENT DATABASE

(71) Applicant: MarkLogic Corporation, San Carlos, CA (US)

(72) Inventors: Fayez Saliba, Menlo Park, CA (US); Christopher Lindblad, Moraga, CA (US)

(73) Assignee: MarkLogic Corporation, San Carlos, CA (US)

( * ) Notice: Subject to any disclaimer, the term of this patent is extended or adjusted under 35 U.S.C. 154(b) by 714 days.

(21) Appl. No.: 15/406,650

(22) Filed: Jan. 13, 2017

(51) Int. Cl.
*G06F 16/00* (2019.01)
*G06F 16/81* (2019.01)
*G06F 16/84* (2019.01)
*G06F 16/93* (2019.01)
*G06F 16/835* (2019.01)

(52) U.S. Cl.
CPC .......... *G06F 16/81* (2019.01); *G06F 16/8373* (2019.01); *G06F 16/84* (2019.01); *G06F 16/93* (2019.01)

(58) Field of Classification Search
None
See application file for complete search history.

(56) References Cited

U.S. PATENT DOCUMENTS

| | | | | |
|---|---|---|---|---|
| 2002/0095654 | A1* | 7/2002 | Fukase | G06F 8/30 717/106 |
| 2003/0158841 | A1* | 8/2003 | Britton | G06F 16/972 |
| 2004/0249795 | A1* | 12/2004 | Brockway | G06F 16/951 |
| 2005/0229158 | A1* | 10/2005 | Thusoo | G06F 17/2205 717/115 |
| 2013/0166568 | A1* | 6/2013 | Binkert | G06F 16/245 707/741 |
| 2014/0108414 | A1* | 4/2014 | Stillerman | G06F 16/00 707/741 |
| 2016/0371368 | A1* | 12/2016 | Brown | G06F 16/332 |
| 2017/0193041 | A1* | 7/2017 | Fuchs | G06F 16/2453 |

* cited by examiner

*Primary Examiner* — Son T Hoang
(74) *Attorney, Agent, or Firm* — Cooley LLP

(57) ABSTRACT

An apparatus has a processor and a memory connected to the processor. The memory stores instructions executed by the processor to ingest and store a semi-structured document within a database. A template is suggested based upon an evaluation of the semi-structured document. The template includes a context specification of a template path that corresponds to a path within the semi-structured document. The template further includes an index specification characterizing data to be extracted from the semi-structured document. A template selection is received. The template selection is executed to form an index entry for the semi-structured document within an index.

15 Claims, 6 Drawing Sheets

US 10,769,209 B1

APPARATUS AND METHOD FOR TEMPLATE DRIVEN DATA EXTRACTION IN A SEMI-STRUCTURED DOCUMENT DATABASE

FIELD OF THE INVENTION

This invention relates generally to database administration. More particularly, this invention relates to techniques for template driven data extraction in a semi-structured document database.

BACKGROUND OF THE INVENTION

Semi-structured documents do not have a formal structure, but they do contain tags or other markers to separate semantic elements and enforce hierarchies of records and fields. Extensible Markup Language (XML) documents and JavaScript Object Notation (JSON) documents are examples of semi-structured documents. Different query tools are available for semi-structured document databases. For example, XML Path Language (XPath) is a query language for selecting nodes within an XML document. Nevertheless, many database administrators and users prefer the traditional relational database model and its popular query language, Structure Query Language (SQL). Others prefer processing in a triple store. A triple store is a database for the storage and retrieval of triple entities, commonly expressed as a subject, predicate and object. A triple store is optimized for the storage and retrieval of such triples.

Like a relational database, one stores information in a triple store and retrieves it via a query language, such as SPARQL. SPARQL is a Resource Description Framework (RDF) format established by the RDF Data Access Working Group of the World Wide Web Consortium. SPARQL is an acronym derived from SPARQL Protocol and RDF Query Language. SPARQL allows for a query to comprise triple patterns, conjunctions, disjunctions and optional patterns.

In view of the foregoing, it would be desirable to provide users with multiple query option formats for data in a semi-structured database. Unfortunately, extracting relational data and triples from a semi-structured document is not easy. Therefore, there is a need to provide tools to extract such data to support multiple query formats in connection with a semi-structured document database.

SUMMARY OF THE INVENTION

An apparatus has a processor and a memory connected to the processor. The memory stores instructions executed by the processor to ingest and store a semi-structured document within a database. A template is suggested based upon an evaluation of the semi-structured document. The template includes a context specification of a template path that corresponds to a path within the semi-structured document. The template further includes an index specification characterizing data to be extracted from the semi-structured document. A template selection is received. The template selection is executed to form an index entry for the semi-structured document within an index.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
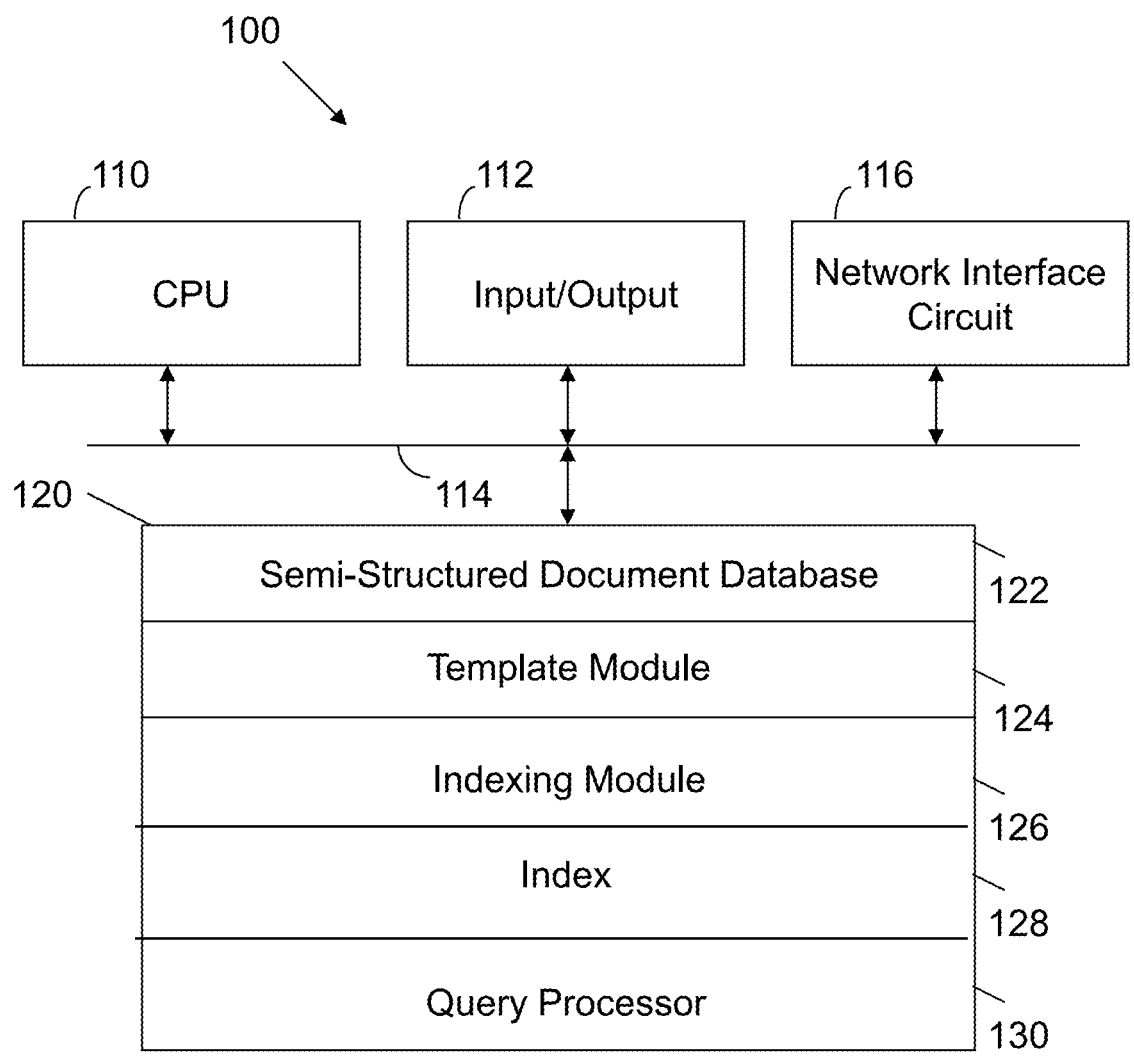
FIG. 1 illustrates a machine configured in accordance with an embodiment of the invention.

FIG. 1 illustrates a machine 100 configured in accordance with an embodiment of the invention. The machine 100 includes a central processing unit 110 connected to input/output devices 112 via a bus 114. The input/output devices 112 may include a keyboard, mouse, display and the like. A network interface circuit 116 is also connected to the bus 114. The network interface circuit 116 provides connectivity to a network, which may be any combination of wired and wireless networks. A memory 120 is also connected to the bus 114. The memory 120 stores a semi-structured document database 122. The semi-structured document database includes a collection of documents having semi-structured data. The term "document" as used herein is any type of semi-structured data segment.

The memory 120 also stores a template module 124. The template module 124 includes a repository of templates and template selection logic. Upon ingestion of a new semi-structured document, the template module 124 selects one or more templates that may be useful in collecting relational data and/or triple data from the ingested document. A path in an input document defines a context. The path or context is compared with corresponding paths or contexts in the repository of templates. One or more templates may then be selected to produce index data, which specifies relational and/or triple data extracted from the document.

An indexing module 124 may execute the template to create index entries in index 128. The indexing module 124 includes instructions executed by the central processing unit 110 to implement operations disclosed herein, including some operations discussed in connection with FIG. 2.

The query processor 130 includes instructions executed by central processing unit 110 to process queries. The query processor 130 is configured to process standard (e.g., Xpath) queries against the semi-structured document database 122. In addition, the query processor 130 is configured to process relational and triple queries by utilizing the index 128.

Figure 2:
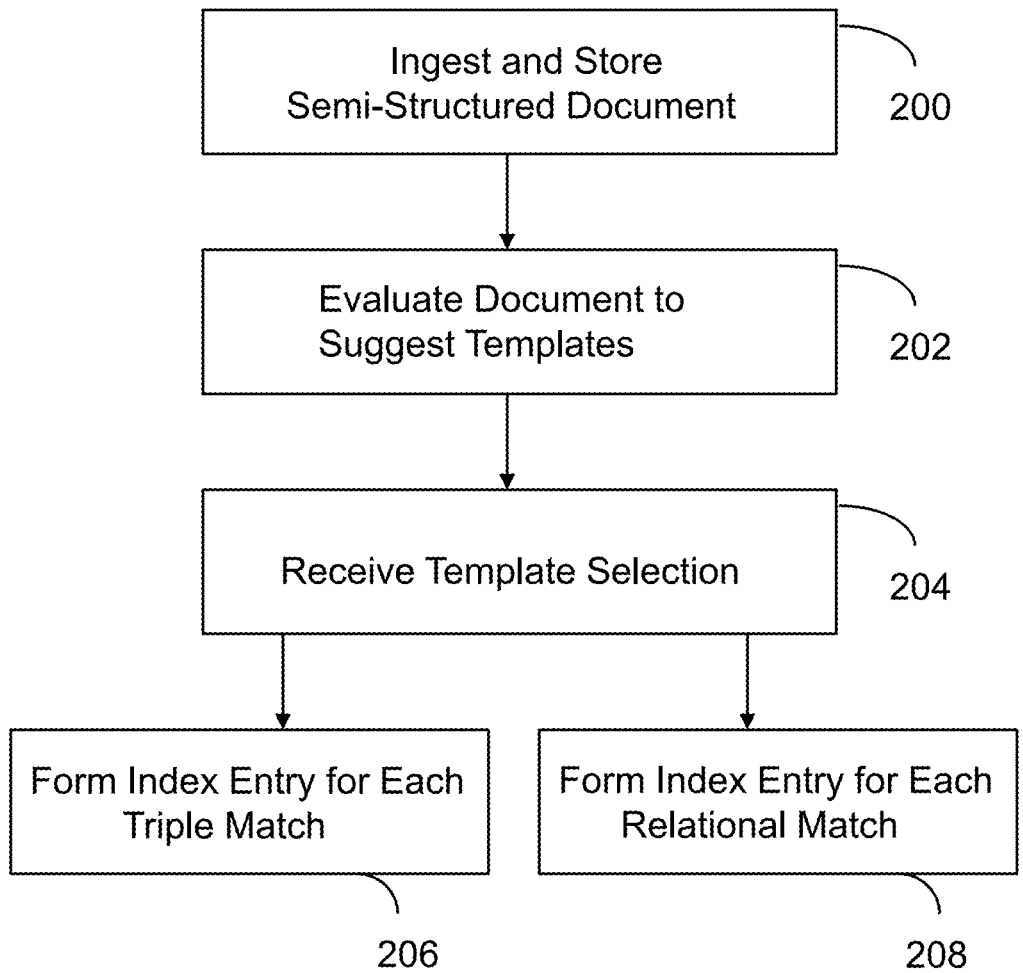
FIG. 2 illustrates processing operations associated with a template module and an indexing module utilized in accordance with an embodiment of the invention.

FIG. 2 illustrates processing operations associated with the template module 124 and the indexing module 126. A semi-structured document is ingested and stored 200. The semi-structured document is evaluated and one or more templates are suggested 202 by the template module 124. The template module 124 might supply different templates for different parts of the document being processed. Thus, template selection is dynamic and may take place several times for different segments of a document.

A template selection may then be received 204 by the template module 124. In one embodiment, the template selection is automatic based upon a highest ranked template. Alternately, the template selection may be based upon user selection. The user can control template selection by modifying a template's context.

The template module 124 then passes the one or more templates to the indexing module 126 for processing. In particular, the indexing module forms an index entry for each triple match 206 and forms an index entry for each relational match 208.

Figure 3:
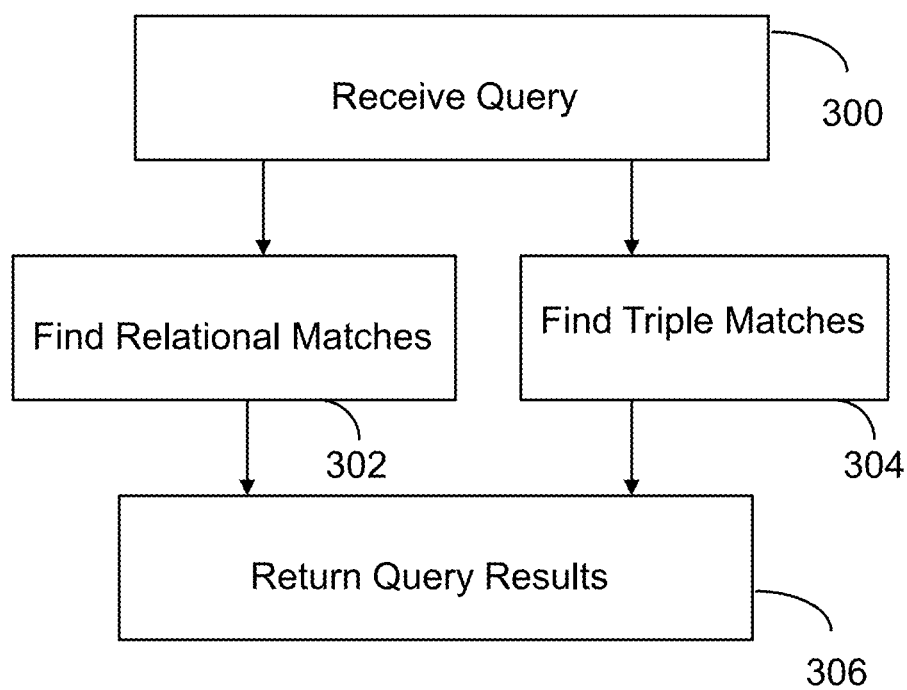
FIG. 3 illustrates processing operations associated with a query processor utilized in accordance with an embodiment of the invention.

FIG. 3 illustrates processing operations associated with an embodiment of the query processor 130. A query is received 300. The query may be an XPath, relational or triple query. In the case of a relational query, relational matches are identified 302. In the case of a triple query, triple matches are identified 304. Query results are then returned 306.

Imagine a hypothetical company A with a tabular database. The company wants to start accepting document-oriented data and make it searchable using a relational query language, such as SQL. The requirement is to avoid using any Extract-Transform-Load (ETL) system on the side that would transform the input data and make it consumable in some tabular format. Instead, the goal is to keep the document-oriented source material intact and have the ability to project parts of the source material into tables by constructing different types of rows from the originating material.

Imagine a hypothetical company B with a triple store. The company wants to start accepting document-oriented data and make it searchable using a semantic query language, such as SPARQL. The company has similar requirements as company A with the only difference being that they want to construct triples from the data contained in the source material.

Both companies A and B would have to resort to transforming the document-oriented material first before making it searchable through their query languages. Traditionally, it has been difficult to query parts of data from a document-oriented source material using relational and semantic query languages. Often times, the source data have to undergo several stages of ETL before it can be presented in tabular formats that are easily ingestible by tabular databases. Similarly, semantic searches on data that is not presented directly in some triples format required some degree of data transformation before the data is ready to be ingested and indexed by triple stores. Some solutions expect the triples or rows to be embedded in the document-oriented source data, or to be added as metadata or even to be stored separately from the source data. Since the source and derived data must remain consistent, any update to the source material means that the related row or triple data have to be regenerated as well. Even simple changes in the data schema, like the addition of a column to a relational table, require the regeneration of rows for all affected source material. This data synchronization process adds more data management complexity to the application that is handling all the create, read, update and delete (CRUD) operations on the source data. The application has to be aware of all the required data transformations and has to manage the relationship between a source document and its extracted data.

Disclosed herein is a new mechanism, built into a database system, for specifying and extracting the data to be ingested into tabular or triple form from document-oriented data. The mechanism comprises adding to the database system an extraction engine driven by user-defined extraction templates that are efficiently applied during the ingestion of documents. The main driver behind the template mechanism is to make it easy for developers to think, in a document oriented model, about mapping document data to rows and triples while providing a rich language that lets them easily describe the data transformations as well as the projections from the document without compromising extraction speed and efficiency. The templates also run in a reasonably bounded time, which implies that several constraints are built into the template language to prevent the developer from writing inefficient templates.

The template mechanism is universal in the sense that the projection from a source document-oriented data into the indexes is not only limited to row and triple indexes. In fact, the projection can be applied to a wide range of indexes including but not limited to columnar indexes, tabular indexes, geospatial indexes, range indexed, and field indexes.

The extraction templates can be completely independent from the applications that manage the document updates. There is also a clear separation between the mapping mechanism of the templates and the documents that the templates operate on. An application developer as well as a database administrator does not need to have full knowledge of the template format, language or mechanics. The application only needs to be concerned with updating a document's structure and managing CRUD operations on the document. The template developer only needs to know about the document structure and the template mechanism.

The extraction templates are built into the database transactional update system; templates trigger when the document update transaction is taking place and execute the extraction of the relational tables and semantic triples at the same time the document data is getting updated. This guarantees that when a document-oriented data transaction (creation, deletion, or update) is fully committed, the relational tables and semantic triples are up-to-date with the document and are immediately available for query. Users are relieved from the task of managing data synchronization, since the extracted and indexed rows and triples always remain consistent with their originating documents.

The extracted relational and semantic information (e.g., rows and triples) remain associated with the originating document-oriented data and the relationship between the input and extracted data is maintained by the database system. This association back to the originating document enables queries across multiple domains: relational, semantic or document-based (non-relational). As a result, the data can be modeled as documents and queried using relational database query languages such as SQL, or semantic query languages such as SPARQL, or even both.

The template-driven extraction engine 124 does not require any external data transformations or materializations since the row or triple construction process is transparent to users and takes place in the template extraction engine 124 and/or indexing module 126. The basic component of template-driven extraction is a template which is an artifact that a user creates to specify how documents will be extracted and indexed. A template specifies how a row or a triple can be constructed and indexed using different parts of an input document. A template is entirely independent from the data documents—a template does not change source documents in any way.

The template engine 124 is designed to efficiently perform with a wide variety of templates operating on a wide range of documents, such as XML and JSON documents. The built-in template engine 124 can trigger the right templates to automatically update the relational and semantic information for an incoming document. However, since not all templates apply to the same input document, the template matching and triggering process need to be efficient and very selective. Looping through all templates every time a new document is ingested would be extremely inefficient. Instead, given the current ingested/updated document and its properties, a fast matching engine can efficiently filter the complete set of templates and provide a much smaller candidate set of matching templates that are considered for extraction.

Since the extraction should not trigger on every part of a document either, context awareness was built into the template structure and language. The template matching engine 124 can also take into account the context (the part of the source data) for which the associated template should be triggered. On can think of the context as a tool for the template developer to describe from which point of reference in a document the data should be collected. This point of reference is referred to as a path. By triggering on specific contexts in a document, the template engine can very quickly find from the whole pool of possible templates the templates that are relevant to a document before triggering the evaluation of the matching templates. This is efficiently done through a series of hash lookup based on matching the contexts with the document's node properties. For example, for an XML, document, these lookups can be for element or attribute keys. To increase the speed of matching, other filtering mechanisms are built into the matching engine. The template language enables the developer to further limit the template scope to documents with specific tags or/and to documents located under specific URIs.

The template extraction engine 124 includes a built-in parser and evaluator for a domain-specific language that is referred to as the template language. The language is designed to make it natural to express the mapping of the data into rows and triples, while preventing inefficient template constructs and slow operations. Since the data have to be easily selected and matched in a document, the language supports navigation along the document tree structure, both in the definition of the contexts as well as the mapping-transformation part of the template. The user can specify a context that controls where in the document the row/triple should be extracted and when the template should be triggered. The context defines an anchor in the document tree where data is collected by walking the document tree structure relative to the anchor. This navigation and matching mechanism is similar to that of some query languages like XPath, JSONPath or JSPATH.

The context allows users to be very specific about the parts of a document that trigger a template and the conditions and circumstances under which the template should be triggered. For example, one can imagine a database that contains mixed documents related to customer orders, customer details, product details, and supplier details. A user can write a context that can trigger a template only on documents that contain product details, and further narrow down the extraction of product information to a specific product category (as long as that information is contained in the same document). A context should provide the means to specify a match unambiguously: since suppliers, customers and products can all have IDs, writing a context that triggers only on the occurrence of the element ID in the document is ambiguous and can cause false matches as well as extraction errors. A better explicit context would trigger a template when an ID is found under a section that describes a product where the product's category is "A" and the product's price is more than X. In order to achieve this, the context is able to match multiple criteria in a document's tree. The context is also designed to match multiple occurrences of similarly structured data. For example, a single document can contain the description of several products. The context should trigger a match and extraction for every occurrence of a product section in the document (unless exclusions are applied in the context itself, like excluding dairy products). Once a context match is identified, the extraction becomes relative to the current context. For example, once an ID is found under a product section, a product name that exists next to the current ID can be extracted. Inside the extraction, any other part of the document can be referenced as long as it can be expressed relative to the current context. The context and the extraction cannot reference data that doesn't exist in the current document. For instance, if a supplier ID is listed in the document but not the name of the supplier, the extraction cannot query and fetch other documents for the supplier name.

The fact that the context can be very specific allows templates to be triggered only when there are full matches in the document tree. A user can write 3 templates to extract product, supplier and customer information. A partial trigger on all 3 templates might start when an ID is encountered in the document, however only the supplier extraction template is triggered if that ID is under a supplier section. By keeping track of which templates are partially triggered for a specific occurrence (like ID) and the additional criteria that trigger a complete match, the extraction can remain fast and very precise. The extraction/transformation is never evaluated unless a complete match has been established.

In order to keep the extraction and transformation fast, the template language is restricted at the parser level to a controlled set of functions and a short list of statements. When a set of candidate templates is filtered and triggered for a specific context, the template engine runs in a secure isolated sandbox where the only inputs to the system are the source data (document) itself and the candidate templates. This prevents users from launching operations that can slow down the execution of the templates and as a consequence slow down the document transaction itself. Operations like database management, accessing other parts of the database, connecting to the internet, or reading external files are forbidden. These built-in constraints keep the template engine fast, but most importantly secure. Users can never access any information that lies beyond the boundaries of the document or the related triggered templates.

The template language is flexible enough to enable complex data operations and transformations, similar to what is typically supported by ETL tools. The language supports many expressions/functions including but not limited to path navigation and matching, operations on sequences, arithmetic expressions, comparison expressions, logical/conditional expressions, data validation, data and time functions, string functions, type casting and mathematical functions.

With a single extraction template, users can create multiple rows under different relational tables. Users can also describe how each field in a row is constructed using the extracted data directly or indirectly if the user chooses to apply transformations to the extracted data before projecting it into the relational tables. A template contains a description of the relational table with its columns and how each column is populated relative to the matching context in the source data. A template can also include different projections into multiple relational tables. Multiple templates can apply to the same document and can reference the same relational table.

A user can define many triple projections in a single template; each projection specifies the parts of a document tree that are mapped to a triple's subject, predicate and object. Transformation can also be applied to the extracted data.

A template can have variables that are used for extracting data at multiple levels of the document's hierarchy and making that data available for extraction that take place at a deeper level in the document's hierarchy. For that reason, templates can be nested. A template has its own local variables and inherits variables from its parent template. For example, top-level non-repeating values can be extracted once and stored in variables that can be used later in child/descendant templates. Also, each child template has a context relative to its parent's context.

Each variable, row field, subject, predicate and object is assigned a content expression that is evaluated for each context match. The disclosed processing is applied whenever a document is indexed. Indexing takes place at ingestion time whenever a document is added or updated. This implies that changes in documents result in automatic updates of the related rows and triples. When a relational table is modified by adding new columns, this triggers re-indexing, which implies that rows will be automatically updated once re-indexing is completed. The disclosed techniques also provide a mechanism for setting up security on SQL columns. The visibility of a view or certain columns of a view can be controlled for different users.

Figure 4:
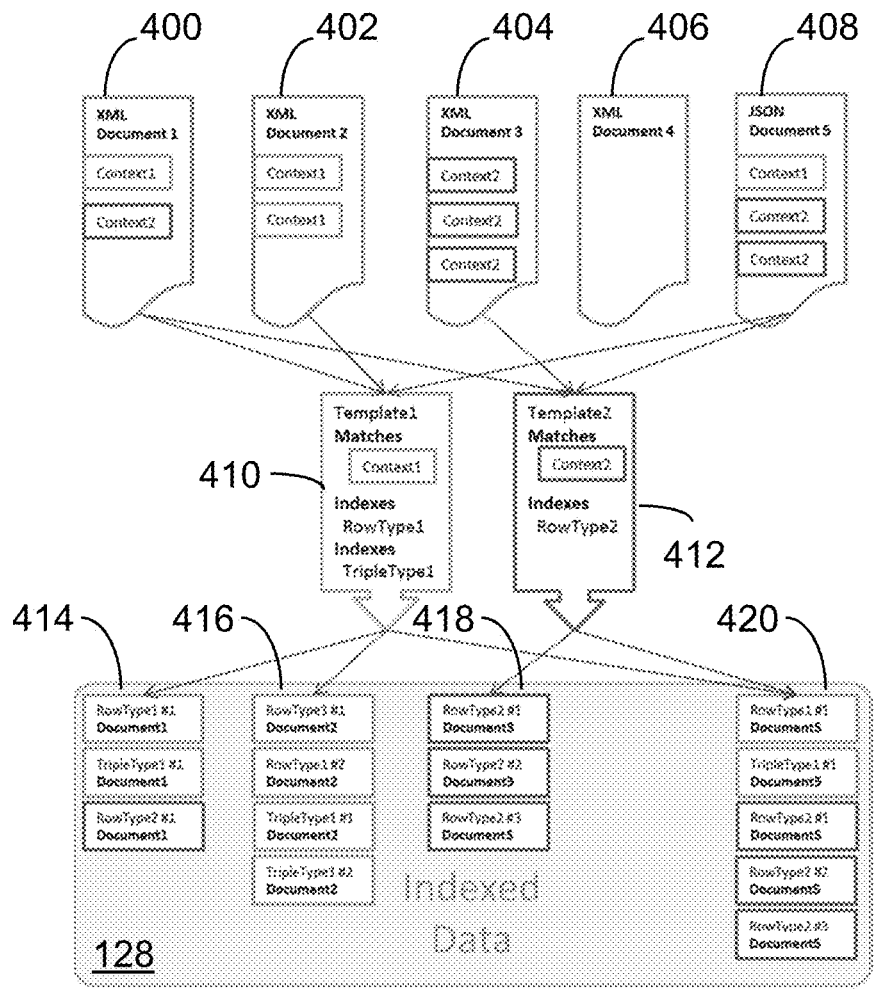
FIG. 4 illustrates an example of creating index entries for documents with different semi-structured data formats in accordance with an embodiment of the invention.

Consider the example of FIG. 4. A first document 400 is an XML document with a first context (context1) and a second context (context2). A second document 402 is an XML document with two instances of the first context. A third document 404 is an XML document with three instances of the second context. A fourth document 406 has no contextual information of interest. A fifth document 408 is a JSON document with the first context and two instances of the second context.

Now consider a first template 410 which specifies the first context. In the event of a context match, the first template 410 forms an index entry of RowType1 and an index entry of TripleType 1. Thus, the first context triggers index entries of both relational and triple types. The second template 412 specifies the second context. In the event of a context match, the second template 412 forms an index entry of RowType2. Thus, the second context triggers a relational index entry.

FIG. 4 illustrates the entries entered into index 128. For the first document, three entries 414 are added. Each entry specifies the document (Document1). One entry has a RowType1 entry from the first template 410, a TripleType1 entry from the first template 410 and a RowType2 entry from the second template 412. The second document has four entries 416 added. Each entry specifies the document (Document2). The second document has two instances of the first context (Context1). This results in two RowType1 entries and two TripleType1 entries. The third document has three entries 418 added. Each entry specifies the document (Document3). The third document 404 has three instances of the second context (Context2). This results in the second template 412 generating three entries for the RowType2. The fifth document produces entries 420. The fifth document 408 has the first context (Context1) and two instances of the second context (Context2). This results in the first template 410 generating an entry of RowType1 and TripleType1 for the first context. The second template 412 generates two RowType2 entries for the two instances of the second context.

Figure 5:
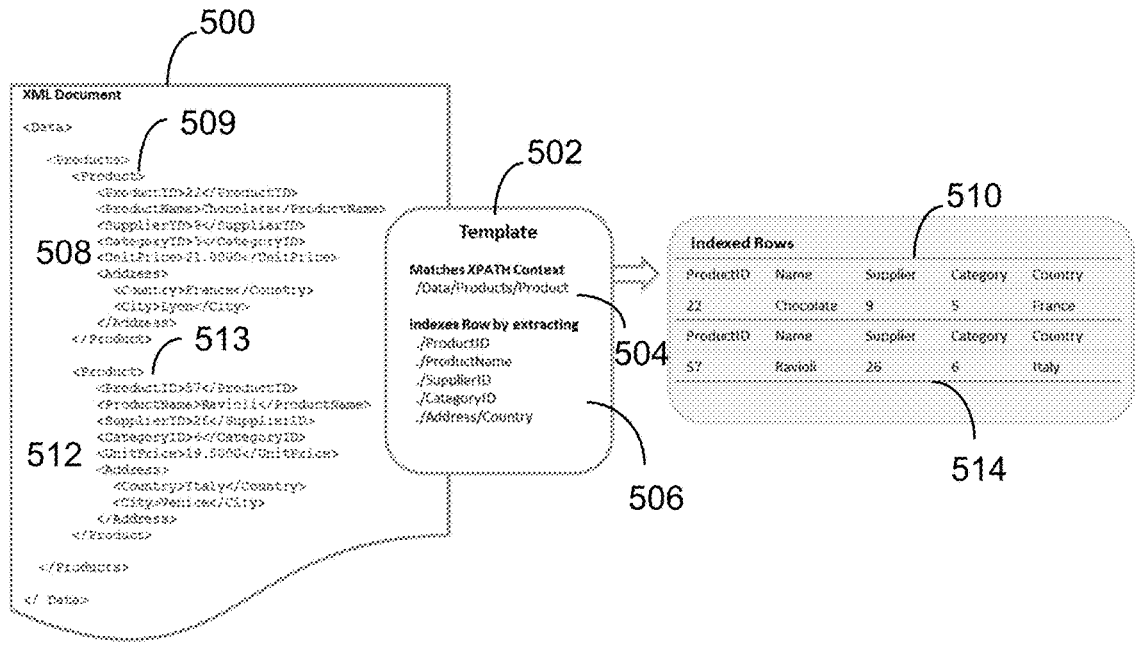
FIG. 5 illustrates an example of the extraction of relational data from a semi-structured data format in accordance with an embodiment of the invention.

FIG. 5 illustrates an exemplary XML document 500. A template 502 includes a context specification 504 and indexing specification 506. In this example, the context specification is an XPath of /Data/Products/Product. The indexing specification 506 is invoked upon a context match with a new document. In such a case, the indexing specification 506 includes instructions specifying the row data to be extracted. In this example, data extraction starts from the /Data/Products/Product context. In the code snippet 508 this is node 509 and in the code snippet 512 this is node 513. The indexing specification 506 extracts ./ProductID, ./ProductName, ./SupplierID, ./CategoryID and ./Address/Country. Observe that the data extraction is selective. For example, the /UnitPrice field is omitted, as is the /Address/City field. This results in extracted row 510 from code 508 and extracted row 514 from code 512.

Figure 6:
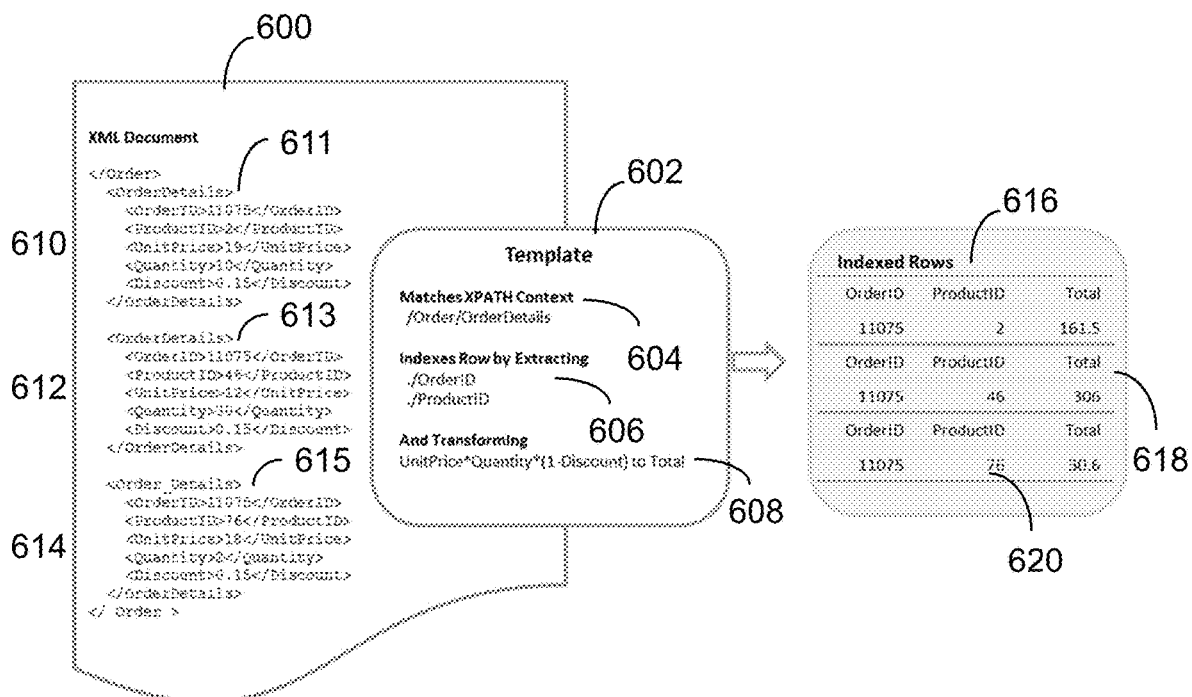
FIG. 6 illustrate another example of the extraction of relational data from a semi-structured data format in accordance with an embodiment of the invention.

FIG. 6 illustrates another exemplary XML document 600. A template 602 includes a context specification 604, an indexing specification 606 and a transformation specification 608. The transformation specification 608 performs an operation on extracted data. In this case, UnitPrice is multiplied by Quantity, which is multiplied by (1-Discount) to form a Total. The UnitPrice, Quantity and Discount values are extracted from code snippets 610, 612 and 614. The context specification 604 is /Order/OrderDetails, which leads to nodes 611, 613 and 615. The indexing specification 606 extracts from ./OrderID and ./ProductID. The transformation specification 608 utilizes the other elements in code snippets 610, 612, and 614. Template 602 is operative to from row 616 from code snippet 610, row 618 from code snippet 612 and row 620 from code snippet 614.

Figure 7:
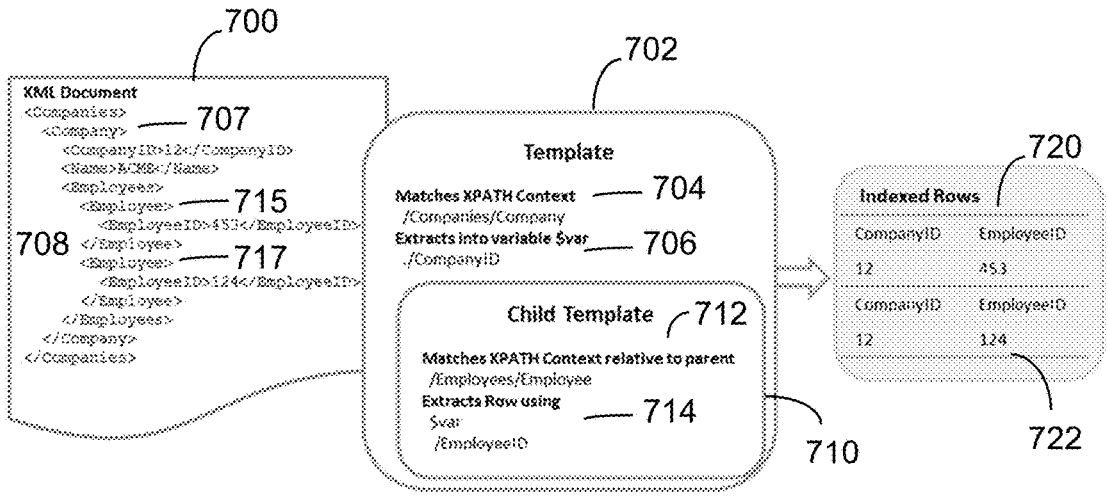
FIG. 7 illustrates the use of a nested template to extract relational data from a semi-structured data format in accordance with an embodiment of the invention.

FIG. 7 illustrates the notion of nested templated based upon relative contexts. The figure illustrates XML document 700 and template 702. Template 702 includes a context specification 704 and an indexing specification 706. The context specification 704 is /Companies/Company, which corresponds to node 707 in code snippet 708. The child template 710 includes a context specification 712 dependent upon the existing context. The context specification 712 is /Employees/Employee in the context of /Companies/Company. This specifies nodes 715 and 717. The indexing specification 714 is ./EmployeeID. Execution of template 702 and child template 710 produces rows 720 and 722. While FIG. 7 illustrates a single child template 710, there could be multiple children. Children can also contain their own child templates, which implicates recursive processing.

Figure 8:
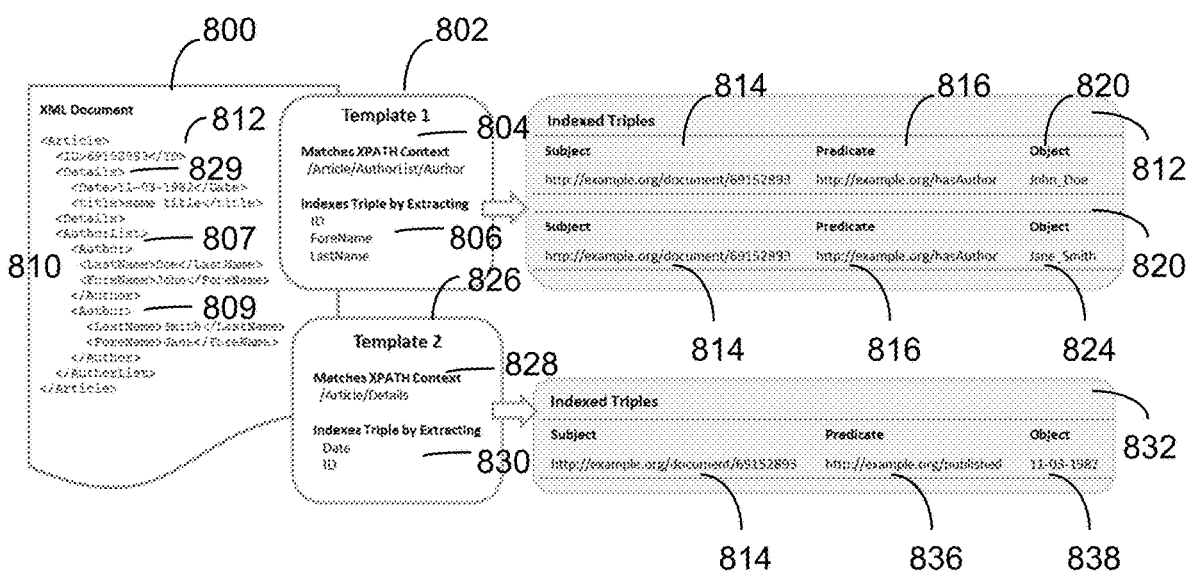
FIG. 8 illustrates an example of the extraction of triple data from a semi-structured data format in accordance with an embodiment of the invention.

FIG. 8 illustrates triple extraction in accordance with an embodiment of the invention. The figure illustrates XML document 800 and template 802. The template 802 includes a context specification 804 and an indexing specification 806. The context specification 804 is /Articles/AuthorList/Author, which corresponds to nodes 807 and 809 in code snippet 810. The indexing specification 806 extracts ID from node 812. ForeName and LastName are extracted from subfields of nodes 807 and 809. Execution of the template 802 produces triple 812. Triple 812 includes a pre-defined element http://example.org/document/, which is appended with the ID of node 812. Predicate 816 is a pre-defined element http://example.org/hasAuthor. Object 820 combines the extracted ForeName and LastName sub-fields of node 807. Triple 820 has the same subject 822 and predicate 816 as triple 812. The object 824 combines the extracted Fore-Name and LastName sub-fields of node 809.

FIG. 8 also illustrates a second template 826 with a context specification 828 and an indexing specification 830. The context specification 828 is /Article/Details, which corresponds to node 829. The indexing specification 830 extracts Date as a sub-field of node 829 and ID from node 812. The second template 826 produces triple 832. The subject 814 is the same as the previous triples. The predicate 836 is a pre-defined element http://example.org/published. The object 838 is extracted from the Date sub-field of node 829. The subject, predicate and object may be pre-defined or dynamically formed by extracting data from the document. The dynamic formation may include data appending and/or data transformations.

As previously discussed, the processing of a single document may result in the selection of a many templates for different sections (contexts) of the document. A single template can form multiple index entries for a single context match.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. An apparatus, comprising:
a processor implemented by hardware; and
a memory connected to the processor, the memory storing instructions executed by the processor to:
ingest and store a semi-structured document within a database;
suggest a template based upon an evaluation of the semi-structured document, wherein
the template includes a context specification defining a template context that corresponds to a context within the semi-structured document, and
the template further includes an index specification characterizing data to be extracted from the semi-structured document;
receive a template selection of the suggested template;
execute the template selection to form an index entry of a respective query format for the semi-structured document within an index, of the database, that supports multiple query formats, including relational query format and triple (subject-predicate-object) query format;
receive a query in at least one of the multiple query formats; and
resolve the query in the at least one of the multiple query formats against the index.

2. The apparatus of claim 1, wherein the index is a columnar index.

3. The apparatus of claim 1, wherein the index is a geospatial index.

4. The apparatus of claim 1, wherein the index is a range index.

5. The apparatus of claim 1, wherein the index is a field index.

6. The apparatus of claim 1, further comprising instructions executed by the processor to:
receive a first template selection with a first context specification and a first index specification, and
receive a second template selection with a second context specification and a second index specification.

7. The apparatus of claim 6, further comprising instructions executed by the processor to execute the first template selection to form a first index entry for the semi-structured document within the index and execute the second template selection to form a second index entry for the semi-structured document within the index.

8. The apparatus of claim 1, wherein the template includes a transformation specification characterizing operations to be performed on the data extracted from the semi-structured document.

9. The apparatus of claim 1, wherein the template includes a child template with a nested context specification relative to the context specification.

10. The apparatus of claim 9, wherein the child template has a nested child template.

11. The apparatus of claim 1, wherein the index entry is a triple data entry with a subject including a predefined element and an appended element extracted from the semi-structured document, a predicate with a predefined element and an object with the data extracted from the semi-structured document.

12. The apparatus of claim 1, wherein the index entry is a triple data entry including a pre-defined subject, predicate and object.

13. The apparatus of claim 1, wherein the index entry is a triple data entry including a dynamically formed subject, predicate and object extracted from the semi-structured document.

14. The apparatus of claim 1, wherein the index entry is a triple data entry with data appended to the data extracted from the semi-structured document.

15. The apparatus of claim 1, wherein the index entry is a triple data entry with transformed data from the semi-structured document.

\* \* \* \* \*